United States Patent
Maletic et al.

(10) Patent No.: US 10,287,959 B2
(45) Date of Patent: May 14, 2019

(54) METHOD FOR DETERMINING THE AGING OF AN OXIDATION CATALYST IN AN EXHAUST GAS AFTERTREATMENT SYSTEM OF AN INTERNAL COMBUSTION ENGINE, METHOD FOR DETECTING ASH IN A PARTICLE FILTER OF AN EXHAUST GAS AFTERTREATMENT SYSTEM, CONTROL DEVICE, AND INTERNAL COMBUSTION ENGINE

(71) Applicant: MTU FRIEDRICHSHAFEN GMBH, Friedrichshafen (DE)

(72) Inventors: Boban Maletic, Friedrichshafen (DE); Gerald Fast, Markdorf (DE); Jens Niemeyer, Friedrichshafen (DE); Tim Späder, Langenargen (DE); Ralf Müller, Deggenhausertal (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 177 days.

(21) Appl. No.: 15/120,319

(22) PCT Filed: Sep. 11, 2014

(86) PCT No.: PCT/EP2014/002458
§ 371 (c)(1),
(2) Date: Aug. 19, 2016

(87) PCT Pub. No.: WO2015/127949
PCT Pub. Date: Sep. 3, 2015

(65) Prior Publication Data
US 2017/0074146 A1    Mar. 16, 2017

(30) Foreign Application Priority Data

Feb. 27, 2014 (DE) .................. 10 2014 203 621

(51) Int. Cl.
*F01N 11/00* (2006.01)
*F01N 3/10* (2006.01)
(Continued)

(52) U.S. Cl.
CPC ........ *F01N 11/002* (2013.01); *B01D 46/0061* (2013.01); *F01N 3/0231* (2013.01);
(Continued)

(58) Field of Classification Search
CPC .......... F01N 3/20; F01N 11/00; F01N 11/002; F01N 2550/02; B01D 46/0061
(Continued)

(56) References Cited

U.S. PATENT DOCUMENTS 8,756,987 B2   6/2014   Schoemig et al.
9,027,329 B2   5/2015   Sun
(Continued)

FOREIGN PATENT DOCUMENTS

CN   102165157 A   8/2011
CN   102678240 A   9/2012
(Continued)

OTHER PUBLICATIONS

JP 20090300568 translation.*

*Primary Examiner* — Eric S. McCall
*Assistant Examiner* — Timothy P Graves
(74) *Attorney, Agent, or Firm* — Lucas & Mercanti, LLP; Klaus P. Stoffel

(57) ABSTRACT

A method for determining the aging of an oxidation catalyst in an exhaust gas aftertreatment system of an internal combustion engine, having the following steps: ascertaining a soot burn rate of a particle filter of the exhaust gas aftertreatment system; adapting a function having at least one adaptation parameter to the soot burn rate dependent on at least one variable, a value of the adaptation parameter (Continued)

depending on an aging of the oxidation catalyst; and determining the aging of the oxidation catalyst using the adaptation parameter value ascertained by adapting the function.

15 Claims, 2 Drawing Sheets

(51) Int. Cl.
*F01N 9/00* (2006.01)
*F01N 3/023* (2006.01)
*B01D 46/00* (2006.01)
*G01M 15/10* (2006.01)

(52) U.S. Cl.
CPC .............. *F01N 3/103* (2013.01); *F01N 9/002* (2013.01); *F01N 11/00* (2013.01); *G01M 15/102* (2013.01); *B01D 2273/18* (2013.01); *B01D 2279/30* (2013.01); *F01N 2550/02* (2013.01); *F01N 2550/04* (2013.01); *F01N 2560/026* (2013.01); *F01N 2560/06* (2013.01); *F01N 2560/08* (2013.01); *F01N 2560/14* (2013.01); *F01N 2900/0412* (2013.01); *F01N 2900/0416* (2013.01); *F01N 2900/1402* (2013.01); *F01N 2900/1606* (2013.01); *F01N 2900/1611* (2013.01); *Y02T 10/47* (2013.01)

(58) Field of Classification Search
USPC ...................................................... 73/114.75
See application file for complete search history.

(56) References Cited

U.S. PATENT DOCUMENTS

| | | | |
|---|---|---|---|
| 9,038,370 B2 | 5/2015 | Massner | |
| 9,353,659 B2 | 5/2016 | Singh et al. | |
| 2009/0151330 A1* | 6/2009 | Chamarthi | F01N 9/002 60/286 |
| 2011/0219746 A1 | 9/2011 | Yezerets et al. | |
| 2011/0232363 A1 | 9/2011 | Pfister | |
| 2013/0263575 A1* | 10/2013 | Sun | F01N 11/00 60/274 |
| 2013/0317722 A1* | 11/2013 | Midlam-Mohler | F02D 41/1401 701/104 |
| 2015/0176450 A1 | 6/2015 | Balthes et al. | |

FOREIGN PATENT DOCUMENTS

| | | |
|---|---|---|
| CN | 103221649 A | 7/2013 |
| DE | 102013205583 A1 | 11/2008 |
| DE | 102008014509 A1 | 2/2009 |
| DE | 102008016792 A1 | 10/2009 |
| DE | 102008027575 A1 | 12/2009 |
| DE | 102010003324 A1 | 9/2011 |
| DE | 102012208539 A1 | 11/2012 |
| JP | 2009030568 A * | 2/2009 |
| JP | 2011185132 A | 9/2011 |
| WO | 2008133694 A1 | 11/2008 |
| WO | 2010034403 A1 | 4/2010 |
| WO | 2013028195 A1 | 2/2013 |
| WO | 2013165302 A1 | 11/2013 |
| WO | 2013185862 A1 | 12/2013 |

* cited by examiner

METHOD FOR DETERMINING THE AGING OF AN OXIDATION CATALYST IN AN EXHAUST GAS AFTERTREATMENT SYSTEM OF AN INTERNAL COMBUSTION ENGINE, METHOD FOR DETECTING ASH IN A PARTICLE FILTER OF AN EXHAUST GAS AFTERTREATMENT SYSTEM, CONTROL DEVICE, AND INTERNAL COMBUSTION ENGINE

The present application is a 371 of International application PCT/EP2014/002458, filed Sep. 11, 2014, which claims priority of DE 10 2014 203 621.6, filed Feb. 27, 2014, the priority of these applications is hereby claimed and these applications are incorporated herein by reference.

BACKGROUND OF THE INVENTION

The invention relates to a method for determining the age of an oxidation catalyst in an exhaust gas aftertreatment system of an internal combustion engine, a method for detecting ash in a particle filter of an exhaust gas aftertreatment system of an internal combustion engine, a control device, and an internal combustion engine.

Exhaust gas aftertreatment systems for internal combustion engines typically have a particle filter which is provided for cleaning soot particles out of the exhaust gas which is expelled by the internal combustion engine. A load of the particle filter is determined on the basis of a loading model by measuring a differential pressure dropping across the particle filter. If passive regeneration of the particle filter by nitrogen dioxide in the exhaust gas, for example during relatively long operation of the internal combustion engine in the low load range or during idling, is not sufficient, active regeneration of the particle filter is carried out, in particular as a function of the detected load, during which regeneration the soot particles are oxidized. It becomes apparent that the differential pressure level across the particle filter rises slowly in the course of the service life of the exhaust gas aftertreatment system. This rise results from two effects which are independent of one another. On the one hand, ash is increasingly deposited in the particle filter, that is to say components are deposited which cannot be burnt but instead remain permanently in the particle filter and increase the differential pressure level by blocking the particle filter; and on the other hand, aging of an oxidation catalyst which is arranged upstream of the particle filter when viewed in the direction of the exhaust gas flow causes nitrogen dioxide to be formed in the exhaust gas to a relatively low degree. This nitrogen dioxide is typically used as an oxidizing agent in the particle filter in order to be able to oxidize soot particles even in operating states of the internal combustion engine in which the exhaust gas temperature is not sufficient to bring about oxidation as a result of the residual oxygen concentration remaining in the exhaust gas. The nitrogen dioxide concentration which decreases as the aging of the oxidation catalyst progresses gives rise accordingly to reduced regeneration, with the result that the differential pressure level rises as a result of the fact that the particle filter is no longer regenerated to the same degree as in the new state of the oxidation catalyst.

These two effects, specifically the increasing depositing of ash on the particle filter, on the one hand, and the aging of the oxidation catalyst, on the other, cannot be separated from one another solely by differential pressure measurement. Therefore, in principle, it is not possible to determine on the basis of the development of the differential pressure in itself whether merely increasing depositing of ash on the particle filter is present or whether at the same time the oxidation catalyst is also exhibiting aging effects. However, it is therefore also the case that only insufficient correction of the loading model with respect to the rise in the differential pressure level is possible because it is not possible to differentiate between the contributions made by the two effects to the increase in the differential pressure. In order always to be able to reliably determine the loading of the particle filter with soot particles it is, however, necessary, on the one hand, to take into account the degree of depositing of ash on the particle filter and, on the other hand, also to take into account the regeneration of said filter in the loading model.

Conventional methods for detecting ash are carried out at operating points of the internal combustion engine at which the aging of the oxidation catalyst does not have any effect on the soot burn-off rate in the particle filter, that is to say typically at the rated power of the internal combustion engine and in the case of a high exhaust gas temperature at which the soot particles are oxidized by the residual oxygen concentration in the exhaust gas. It is clear that in this way no information whatsoever about the aging of the oxidation catalyst can be obtained because said aging does not effect the soot burn-off rate at the operating points under consideration. Adapting the loading model to the slowly rising differential pressure level therefore remains necessarily imprecise.

SUMMARY OF THE INVENTION

The invention is based on the object of providing a method for determining the aging of an oxidation catalyst so that the specified disadvantages do not occur. Furthermore, the invention is based on the object of providing a method for detecting ash in a particle filter, wherein the specified disadvantages do not occur and, wherein, in particular it is possible to differentiate between the effect of depositing of ash on the particle filter, on the one hand, and the effect of aging of the oxidation catalyst, on the other. Furthermore, the invention is based on the object of providing a control device and an internal combustion engine in which the specified disadvantages do not occur either.

The object is achieved by providing a method for determining the aging of an oxidation catalyst in an exhaust gas aftertreatment system of an internal combustion engine. Said method has the following steps: a soot burn-off rate of a particle filter of the exhaust gas aftertreatment system is obtained. A function is adapted to the obtained soot burn-off rate with at least one adaptation parameter as a function of at least one variable, wherein a value of the adaptation parameter is dependent on aging of the oxidation catalyst for the consideration of the soot burn-off rate as a function of the variable. Aging of the oxidation catalyst is determined on the basis of the value of the at least one adaptation parameter which is obtained by adapting the function. In this context it has been recognized that the soot burn-off rate, consequently the regeneration rate of the particle filter, can be used to determine the aging of the oxidation catalyst, if said rate is considered as a function of a variable for which a value of an adaptation parameter of a function to be adapted is dependent on aging of the oxidation catalyst. The soot burn-off rate plotted against the variable provides therefore—formulated mathematically—a function which depends parametrically on the aging of the oxidation catalyst. For this purpose, the soot burn-off rate is preferably obtained at an operating point or in an operating range of the internal combustion engine at or in which such a parametric relationship is provided. Since the depositing of ash does not effect the soot burn-off rate, wherein the latter depends rather only parametrically on the state of aging of the oxidation catalyst, it is possible in this way to determine the aging thereof. Therefore, it is possible to separate the effects described above, which leads in turn to improved detection of ash and improved adaptation of the loading model to the state of the exhaust gas aftertreatment system which is actually present. The determination of aging can also be used to replace the oxidation catalyst according to requirements. As a result, a preventative exchange which is otherwise provided is avoided, which provides advantages in terms of costs, in particular, reduced maintenance costs.

The method is preferably carried out for an exhaust gas aftertreatment system in which a particle filter is arranged downstream of an oxidation catalyst so that an oxidizing agent, in particular nitrogen dioxide, which is generated in the oxidation catalyst, can be used to regenerate the particle filter. Alternatively or additionally, the method is preferably carried out for an exhaust gas aftertreatment system in which the particle filter is coated catalytically—with an oxidation catalyst material. In this case, an oxidation catalyst upstream of the particle filter can be dispensed with.

The term "oxidation catalyst" accordingly refers generally here and below to a device for catalyzing oxidation reactions in the exhaust gas, in particular a separate oxidation catalyst and/or a corresponding catalytic coating of an element of the exhaust gas aftertreatment system, in particular of a particle filter.

An embodiment of the method is preferred which is distinguished by the fact that the aging of the oxidation catalyst is determined by comparing the at least one adaptation parameter with at least one previously determined characteristic value. If the function to be adapted has just one adaptation parameter, this is preferably compared with a threshold value or limiting value. It is possible for a multiplicity of threshold values or limiting values to be stored, wherein each individual threshold value and limiting value is characteristic of a specific aging level of the oxidation catalyst, with the result that very precise determination of the age of the oxidation catalyst is possible as a function of the specific number and density of the threshold values or limiting values. If a function is used which has more than one adaptation parameter, these parameters are preferably compared with parameter sets stored in a characteristic diagram, in order to determine the aging of the oxidation catalyst. The threshold values or limiting values are or the characteristic diagram is preferably permanently implemented or stored for a specific exhaust gas aftertreatment system or for a specific internal combustion engine, particularly preferably in a control device or control unit, configured to carry out the method, of the internal combustion engine.

An embodiment of the method is also preferred which is distinguished by the fact that the function is adapted to the soot burn-off rate as a function of a temperature of the particle filter and of a nitrogen oxide concentration in the exhaust gas. The soot burn-off rate is therefore considered in this case, on the one hand, as a function of the temperature of the particle filter and, on the other hand, as a function of the nitrogen oxide concentration in the exhaust gas, and the function is adapted thereto by varying the at least one adaptation parameter. It has in fact been recognized that in a temperature range in which regeneration of the particle filter takes place essentially or even completely by oxidation of soot by means of nitrogen dioxide as a reducing agent, the temperature range extending preferably from at least 250° C. to maximum 450° C., the soot burn-off rate depends on the state of aging of the oxidation catalyst. The soot burn-off rate is dependent here, on the one hand, on the temperature in the particle filter, in particular on the temperature of the exhaust gas in the particle filter, and, on the other hand, on the nitrogen oxide concentration in the exhaust gas, this being able to define how much nitrogen dioxide can be available at maximum as a reducing agent. In this context, the term "nitrogen oxide concentration" is always used here and below to mean the total nitrogen oxide concentration as a sum of the concentration of the nitrogen monoxide and nitrogen dioxide. It is to be borne in mind that the nitrogen oxide produced by the internal combustion engine upstream of the oxidation catalyst is composed virtually exclusively of nitrogen monoxide which is oxidized in the oxidation catalyst, in particular as a function of the state of aging thereof, to form nitrogen dioxide. Nitrogen oxide sensors which are preferably used measure only the total nitrogen oxide concentration. If the soot burn-off rate is then considered, on the one hand as a function of the temperature and on the other hand as a function of the nitrogen oxide concentration, it becomes apparent that it depends parametrically on the portion of nitrogen dioxide in the nitrogen oxide concentration, which portion is itself again dependent on the state of aging of the oxidation catalyst. Therefore, by adapting the function while varying the at least one adaptation parameter it is possible to obtain information about the aging of the oxidation catalyst. In fact, in the aged oxidation catalyst the oxidation of the nitrogen monoxide to form nitrogen dioxide takes place with reduced efficiency, with the result that this catalyst produces less nitrogen dioxide than an oxidation catalyst in the new state. Overall, the nitrogen dioxide production in the oxidation catalyst therefore decreases as its service life progresses. This can be readily tracked on the basis of the at least one adaptation parameter.

An embodiment of the method is also preferred which is distinguished by the fact that a linear function is adapted to the soot burn-off rate. Alternatively or additionally, it is possible that a second degree polynomial or a third degree polynomial is adapted to the soot burn-off rate. If a linear function is adapted to the soot burn-off rate, it has precisely one adaptation parameter. A second degree polynomial has two adaptation parameters. Finally, a third degree polynomial has three adaptation parameters. Alternatively or additionally, it is also possible to adapt a relatively high degree polynomial to the soot burn-off rate, which polynomial then has correspondingly more adaptation parameters. With respect to the dependence of the soot burn-off rate on the temperature it is to be noted that said soot burn-off rate can be typically described well by a third degree polynomial. However, it is also possible that a second degree polynomial or even a linear function is sufficient for an adequately precise description. The soot burn-off rate is typically linearly dependent on the nitrogen oxide concentration. The functions specified here are all very simple functions which can also easily be adapted to the soot burn-off rate, preferably using the method of the least mean squares. This is very quickly possible using low computing power. In this context, the specified functions at the same time supply a sufficiently high level of accuracy, with the result that there is no need for any complicated functions which would be more time-consuming and also more costly in terms of computing power in the adaptation.

The temperature of the particle filter is preferably obtained by measurement. A first temperature sensor is particularly preferably provided upstream of the particle filter, wherein a second temperature sensor is provided downstream of the particle filter. The temperature of the particle filter is then calculated upstream and downstream thereof as a mean value on the basis of the two temperature measurements. The temperature measurement can alternatively be carried out by means of a temperature sensor which directly measures the temperature in the particle filter and for this purpose is suitably arranged on the particle filter. The nitrogen oxide concentration is, as already indicated, preferably obtained by means of a nitrogen oxide sensor which is preferably arranged directly downstream of the internal combustion engine and preferably also upstream of the oxidation catalyst. Alternatively, the nitrogen oxide concentration can be obtained from a characteristic diagram, in particular as a function of at least one operating parameter of the internal combustion engine.

An embodiment of the method is also preferred which is distinguished by the fact that the soot burn-off rate is obtained by means of the following steps: a differential pressure which drops across the particle filter is obtained. A load of the particle filter is obtained from the differential pressure using a loading model. Furthermore, a soot input, in particular a soot input rate, into the particle filter is obtained. Finally, the soot burn-off rate is obtained from the load and the soot input. In this way, the soot burn-off rate can be obtained at the same time both easily and accurately.

The differential pressure across the particle filter is preferably measured by means of a differential pressure sensor, wherein a first measuring point of the differential pressure sensor is arranged directly upstream of the particle filter, and a second measuring point is arranged directly downstream thereof. Alternatively it is possible for the differential pressure to be calculated as a difference between measured values of two pressure sensors, wherein a first pressure sensor is arranged directly upstream of the particle filter, and wherein a second pressure sensor is arranged directly downstream of the particle filter. The difference between the measured values of the first and second sensors then supplies, in a way analogous to the measurement by means of the differential pressure sensor, the desired differential pressure which drops across the particle filter.

The loading of the particle filter is preferably obtained as a function of time using the loading model. The loading model is preferably corrected for ash, that is to say in particular adapted to instantaneous depositing of ashstate of the particle filter. In this way, the loading model is configured always to be able to calculate loading of the particle filter with soot particles from the differential pressure with the highest possible accuracy without errors due to ash occurring here.

The soot input into the particle filter is preferably calculated as a soot input rate from at least one operating parameter of the internal combustion engine. In this context, at least one operating parameter is used which is characteristic of conditions, which are relevant for the formation of soot, in a combustion chamber of the internal combustion engine. An operating parameter is preferably used which is selected from a group composed of a fuel injection quantity, an injection time, a measured value of a lambda probe, an exhaust gas recirculation rate, a throttle valve position and a rotational speed of the internal combustion engine. The soot input rate is preferably calculated here in a control device or determined using one or more characteristic diagrams, wherein the control device is configured to carry out the method. The soot input rate is particularly preferably calculated in the control unit of the internal combustion engine. In this context, recourse is made to a model which describes the soot input rate as a function of the at least one operating parameter of the internal combustion engine. A multiplicity of operating parameters is preferably used in order to calculate the soot input rate.

It becomes apparent that the soot input rate is preferably calculated independently of the differential pressure across the particle filter. As a result, in fact the loading of the particle filter, on the one hand, and the soot input rate, on the other, are determined independently of one another by means of two different independent models.

The development of the loading of the particle filter over time depends, on the one hand, on the soot input rate and, on the other, on the soot burn-off rate. In particular, the derivation of the loading according to time is obtained as a sum of the soot input rate and of the soot burn-off rate. It is therefore possible to calculate the soot burn-off rate from the loading of the particle filter, on the one hand, and the soot input rate, on the other. If the loading and the soot input rate have been determined here using independent models, a very accurate calculation of the soot burn-off rate is obtained because recourse is not made to redundant information but rather to complementary information.

An embodiment of the method is preferred which is distinguished by the fact that the soot burn-off rate is calculated using a Kalman filter. A Kalman filter constitutes a particularly elegant way of calculating the soot burn-off rate from the load, on the one hand, and the soot input rate, on the other, with low computing power and preferably in real time. In this context, the unfiltered measured values of the differential pressure across the particle filter are preferably also input into the Kalman filter in addition to the load of the particle filter and the soot input rate. In addition to the soot burn-off rate, in this case a filtered profile of the differential pressure as well as a filtered load of the particle filter, determined from the filtered differential pressure profile, is also obtained from the Kalman filter. Furthermore, preferably at least one error estimated value, which permits error correction in the Kalman filter, is input into the Kalman filter. In this context, for the error estimated value it is considered in particular, whether transient operation of the internal combustion engine is present during which the differential pressure values are, under certain circumstances, not informative as to whether a permissible evaluation range of the measured values which are being input, in particular the differential pressure values which are being input, and/or to what extent measurement noise which is not independent is present. In particular an error of the differential pressure measurement which depends on the operating point of the internal combustion engine is preferably input into the error estimated value of the Kalman filter. If it is detected on the basis of the error estimated value that at present no reliable calculation of the soot burn-off rate is possible on the basis of the variables which are being input into the Kalman filter, an extrapolation of the soot burn-off rate calculated until now is preferably carried out here. This is readily possible in the Kalman filter because said filter can to this extent have recourse to internal states, wherein the values which are currently being input are temporarily not taken into account. In this way, an error correction is readily possible using the Kalman filter.

Alternatively, an embodiment of the method is preferred in which the soot burn-off rate is calculated by reverse integration of the load and of the soot input rate. This requires, under certain circumstances, less computation power than the Kalman filter, but on the other hand virtually no error correction is possible.

An embodiment of the method is also preferred which is distinguished by the fact that a development of the soot burn-off rate over time is evaluated. Error detection is carried out using the development over time. As a result it is possible to differentiate various error states from slow aging of the oxidation catalyst which occurs normally. For example it is possible to identify a sudden change in the soot burn-off rate, on the basis of which it is possible to infer destruction or removal of the oxidation catalyst or a sensor defect. In this context it is possible to use the specific form of the change of the soot burn-off rate to identify a specific error. In contrast, a slow constant change in the soot burn-off rate should normally occur as a result of the conventional thermal aging and/or poisoning of the oxidation catalyst.

One embodiment of the method which is distinguished by the fact that the development of the at least one adaptation parameter over time is evaluated as development of the soot burn-off rate over time is particularly preferred. This procedure is distinguished by a particularly low expenditure on computing since only a small amount of data, under certain circumstances even only the development of a single parameter value over time, has to be considered. It is therefore very easily possible to differentiate suddenly occurring error states from the normal slow aging of the oxidation catalyst.

The object is also achieved by providing a method for detecting ash in a particle filter of an exhaust gas aftertreatment system. In this context, a differential pressure which drops across the particle filter is detected. This is preferably done by means of a differential pressure sensor or by means of two sensors, a first of which is arranged upstream of the particle filter and the second downstream of the particle filter, wherein a difference between the measured values of the two sensors is formed as a differential pressure, as has already been described in more detail above. Aging of an oxidation catalyst of the exhaust gas aftertreatment system is determined with an embodiment of the method described above. A loading model for the particle filter is adapted to the aging of the oxidation catalyst. This includes the fact that no adaptation of the loading model takes place if it is detected that the oxidation catalyst has not aged or has not aged further. Moreover, it is possible that during an initial execution of the method using a novel oxidation catalyst the aging thereof is not determined by means of the method described above but instead the method is firstly initialized with a value which corresponds to a lack of aging of the oxidation catalyst. However, in subsequent passes of the method aging is determined as described above. A load of the particle filter is determined using the corrected loading model, which, under certain circumstances, includes an unchanged loading model when there is a lack of aging of the oxidation catalyst. Finally, depositing of ash on the particle filter is detected from the load, on the one hand, and the differential pressure, on the other. As a result of the fact that the loading model can now be adapted to the aging of the oxidation catalyst, it is possible to take into account this effect specifically and therefore separate it from the effect of the depositing of ash on the particle filter. This can be determined readily because after the correction of the loading model with respect to the aging of the oxidation catalyst an enduring deviation between the calculated load values and the load values which are actually expected on the basis of the differential pressure values can be attributed to depositing of ash on the particle filter.

An embodiment of the method is preferred which is distinguished by the fact that the loading model is adapted to the depositing of ash on the particle filter, in particular subsequent to the determination of said depositing of ash. The loading model is then corrected both with respect to the aging of the oxidation catalyst and with respect to the depositing of ash on the particle filter so that very accurate loading values can be calculated for the particle filter using the loading model.

The adaptation of the loading model to the aging of the oxidation catalyst and/or to the depositing of ash on the particle filter is preferably carried out in such a way that the measured differential pressure values are corrected as a function of the aging and/or the depositing of ash and then used in the corrected form as the basis for the calculation of the load by the loading model. Alternatively or additionally it is possible for a setpoint value which is used within the scope of the loading model or a characteristic diagram for the differential pressure to be adapted to the aging of the oxidation catalyst and/or the depositing of ash on the particle filter. It is also alternatively or additionally possible for a functional relationship between the loading of the particle filter and the differential pressure, which is used within the scope of the loading model, to be adapted to the aging of the oxidation catalyst and/or the depositing of ash on the particle filter.

An embodiment of the method is also preferred which is distinguished by the fact that it is initialized with an initial value for the depositing of ash. In this context it is preferably possible that in a new state of the particle filter and/or of the exhaust gas aftertreatment system an initial value is used which is characteristic of depositing of ash which is not present or is lacking, for example the value 0. Alternatively or additionally it is possible that the depositing of ash is determined, in particular, for the initialization of the method according to a known ash detection algorithm, in particular at an operating point in which aging of the oxidation catalyst is not effective, preferably at the rated load of the internal combustion engine and an exhaust gas temperature at which the particle filter is regenerated completely by the residual oxygen content of the exhaust gas. In this way, the detection of the depositing of ash, in particular for the initialization of the method, can be carried out at least once independently of the determination of the aging of the oxidation catalyst.

An embodiment of the method is also preferred in which the depositing of ash is determined repeatedly, preferably regularly, in accordance with the known ash detection method described above. The value which is obtained in this way for the depositing of ash on the particle filter is then used for error correction or for adapting the ash detection method according to the invention.

Finally, an embodiment of the method is preferred in which the method is carried out iteratively. The method for detecting ash particularly preferably always occurs continuously during the operation of the internal combustion engine, with the result that the aging of the oxidation catalyst and the depositing of ash on the particle filter are determined continuously. Accordingly, the loading model is also continuously adapted to the aging of the oxidation catalyst and the depositing of ash on the particle filter. Therefore, accurate current values for the load of the particle filter are always available. Alternatively, it is possible that the method is carried out with interruptions over time, preferably at previously determined time intervals. In this case, the loading model is preferably adapted at previously determined times to the depositing of ash on the particle filter and the aging of the oxidation catalyst. In this context, less expenditure on computing is incurred than when the method is carried out continuously. In this respect, this embodiment of the method is economical and less computationally intensive. The previously determined time intervals are preferably selected in such a way that despite the method being carried out only at certain points sufficiently accurate load values are ensured using the corrected loading model.

Finally, the object is also achieved by providing a control device which is configured to carry out a method for determining the aging of an oxidation catalyst as previously described and/or to carry out a method for detecting ash in a particle filter as previously described. In conjunction with the device, the advantages are implemented which have already been explained in conjunction with the methods.

The control device is preferably embodied as a control unit of an internal combustion engine (Engine Control Unit—ECU). It is alternatively possible for the control device to be embodied as a separate control device which is provided, in particular, especially for carrying out the determination of the aging and/or the detection of ash. It is possible in this context that the control device additionally also performs other tasks.

The control device is preferably configured to carry out the method by virtue of the fact that a hardware structure of the control device is embodied in a suitable way. Alternatively, it is possible for a computer program product to be loaded into the control device, which computer program product has instructions on the basis of which at least one of the methods for determining aging and for detecting ash can be carried out in the control device when the computer program product is executed on the control device.

Finally, the object is also achieved by providing an internal combustion engine that has a control device as in one of the exemplary embodiments described above. Therefore, the advantages which have already been described in conjunction with the control device or with the methods are implemented in conjunction with the internal combustion engine.

The internal combustion engine is preferably embodied as a reciprocating piston engine. In one preferred exemplary embodiment, the internal combustion engine serves to drive, in particular, relatively heavy land vehicles or watercraft, for example mine vehicles, trains, where in the internal combustion engine is used in a locomotive or a power unit, or ships. It is also possible to use the internal combustion engine to drive a vehicle which performs a defense function, for example a tank. An exemplary embodiment of the internal combustion engine is preferably also used in a stationary fashion, for example for the stationary supply of energy in an emergency current mode, permanent load mode or peak load mode, wherein in this case the internal combustion engine preferably drives a generator. A stationary application of the internal combustion engine for driving auxiliary assemblies, for example fire extinguishing pumps on drilling rigs is also possible. Furthermore, an application of the internal combustion engine in the field of the mining of fossil raw materials and in particular fossil fuels, for example oil and/or gas is possible. It is also possible to use the internal combustion engine in the industrial field or in construction, for example in a construction machine or building machine, for example in a crane or excavator. The internal combustion engine is preferably embodied as a diesel engine or as a petrol engine.

The invention will be explained in more detail below with reference to the drawing, in which:

DETAILED DESCRIPTION OF THE INVENTION

Figure 1:
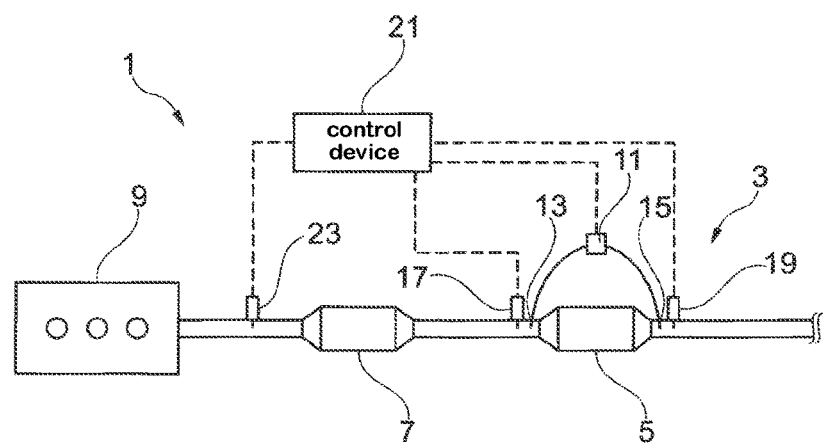
FIG. 1 shows a schematic illustration of an exemplary embodiment of an internal combustion engine.

FIG. 1 shows a schematic illustration of an exemplary embodiment of an internal combustion engine 1 having an exhaust gas aftertreatment system 3. The exhaust gas aftertreatment system 3 has a particle filter 5 and, when viewed in the direction of an exhaust gas flow, an oxidation catalyst 7, which is provided separately here, upstream of the particle filter 5. The exhaust gas flows here through the exhaust gas aftertreatment system 3 from a schematically illustrated engine region 9 to an exhaust gas expulsion device (not illustrated in FIG. 1), wherein in FIG. 1 it flows from left to right and firstly passes through the oxidation catalyst 7 and then the particle filter 5. In addition, or as an alternative, to the separate oxidation catalyst 7 it is possible for the particle filter 5 to have a catalytic coating which acts as an oxidation catalyst.

In order to detect a differential pressure which drops across the particle filter 5, in the exemplary embodiment illustrated here a differential pressure sensor 11 is provided which has a first measuring point 13 upstream of the particle filter 5 and a second measuring point 15 downstream thereof. The differential pressure sensor 11 is configured to measure a differential pressure between the first measuring point 13 and the second measuring point 15.

In order to determine a temperature of the particle filter 5, in particular of the exhaust gas which passes through the particle filter 5, a first temperature sensor 17 is arranged upstream of the particle filter 5, and a second temperature sensor 19 is arranged downstream thereof, said temperature sensors 17, 19 being configured to detect an exhaust gas temperature at their respective position within the exhaust gas aftertreatment system 3. The temperature sensors 17, 19 are preferably operatively connected to a control device 21 which is configured to calculate the temperature of the particle filter 5, preferably as a mean value of the temperature values detected by the temperature sensors 17, 19.

A nitrogen oxide sensor 23 which is configured to detect an overall nitrogen oxide concentration in the exhaust gas flowing through the exhaust gas aftertreatment system 3 is arranged upstream of the oxidation catalyst 7 in the exhaust gas aftertreatment system 3. In this context, the term overall nitrogen oxide concentration, or else nitrogen oxide concentration for short, refers to the sum of the concentrations of nitrogen monoxide and nitrogen dioxide in the exhaust gas. Alternatively, it is possible for the nitrogen oxide sensor 23 to be configured to specifically detect a nitrogen monoxide concentration in the exhaust gas. In the position of the nitrogen oxide sensor 23 illustrated in FIG. 1, this gives rise at most to a slight deviation of the measured value from that of a sensor which is not specifically sensitive to the nitrogen oxide concentration. In fact, it becomes apparent that upstream of the oxidation catalyst 7 nitrogen monoxide is essentially formed, which is partially oxidized to form nitrogen dioxide only in the oxidation catalyst 7. Therefore, the nitrogen oxide concentration at the position of the nitrogen oxide sensor 23 illustrated in FIG. 1 corresponds at any rate essentially to the nitrogen monoxide concentration in the exhaust gas.

The control device 21 is operatively connected to the nitrogen oxide sensor 23, to the temperature sensors 17, 19 and to the differential pressure sensor 11. In this way, in particular, measured values of the various sensors can be transferred to the control device 21 for evaluation. If two pressure sensors are used in another exemplary embodiment instead of the differential pressure sensor 11 and one of which pressure sensors is provided upstream and the other downstream of the particle filter 5, the control device 21 is preferably operatively connected to these two pressure sensors and configured to calculate a differential pressure from the measured values of the two pressure sensors.

The control device 21 is also configured to carry out a method for determining aging of the oxidation catalyst 7 according to one of the embodiments described above and below. Alternatively or additionally, the control device 21 is preferably designed to carry out a method for detecting ash in the particle filter 5 according to one of the embodiments of the ash detection method according to the invention which is described above and explained in more detail below.

Figure 2:
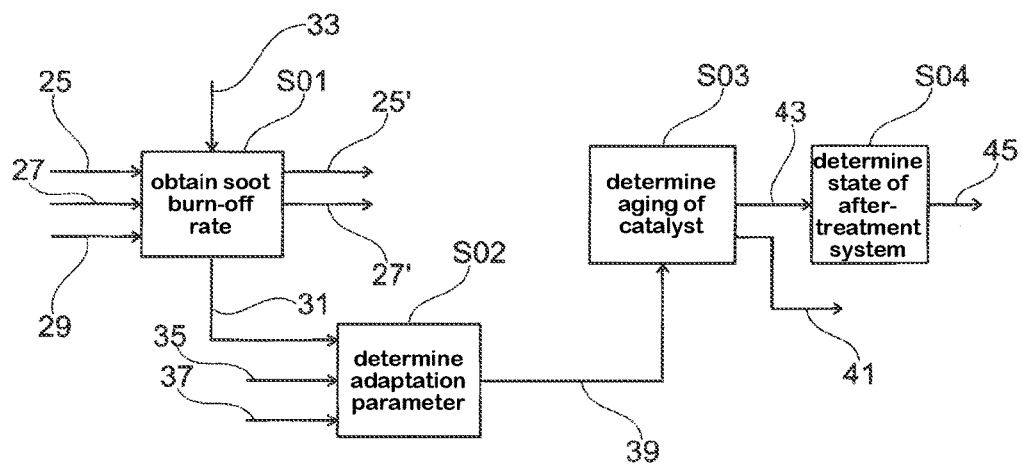
FIG. 2 shows a schematic illustration of an embodiment of the method for determining aging.

FIG. 2 shows a schematic illustration of an embodiment of the method for determining the age of the oxidation catalyst 7. In a first method step S01, a soot burn-off rate of the particle filter 5 is obtained. In this context, the differential pressure 25 which is preferably obtained by means of the differential pressure sensor 11 and which drops across the particle filter 5, a load 27 of the particle filter 5 which is calculated from the differential pressure using a loading model, and a soot input rate 29 which is preferably calculated by the control device 21 using at least one operating parameter of the internal combustion engine 1 are used as input values for the first method step S01. It is possible that only the load 27 and the soot input rate 29 are used as input values for the step S01. In this respect, it is not absolutely necessary also to use the differential pressure 25 explicitly for the first step S01. Instead it may be sufficient that in a preceding step the load 27 is calculated from the differential pressure 25 using the loading model. However, if the differential pressure 25 is explicitly introduced into the first step S01, said differential pressure 25 can be smoothed and/or filtered, with the result that a smoothed and/or filtered differential pressure 25' is obtained as a result from the first step S01. In the same way, a smoothed and/or filtered load 27', in particular a load 27' which is calculated on the basis of the smoothed and/or filtered differential pressure 25', is also preferably obtained as a result from the first step S01.

In the step S01, a soot burn-off rate 31 is calculated from the input values, in particular from the load 27 and the soot input rate 29. This soot burn-off rate 31 is fed as an input value to a second step S02 of the method.

The first step S01 is preferably carried out by means of a Kalman filter. This is a method which is particularly suitable, in particular, for calculations in real time, in order to permit reliable and accurate calculation of the soot burn-off rate as quickly and with as little computing power as possible. Alternatively, it is possible that the soot burn-off rate is calculated in the first step S01 by reverse integration from the load 27 and the soot input rate 29.

In particular, if a Kalman filter is used in the step S01, an error estimated value 33 is preferably input into said filter as a further input value. It is possible that more than one error estimated value 33 is input into the first step S01. The error estimated value 33 preferably takes into account an error in the measurement of the differential pressure sensor 11 or generally the differential pressure, wherein this error is typically dependent on the operating point of the internal combustion engine 1. In particular in transient states of the internal combustion engine 1, the error in the measurement of the differential pressure is typically greater than at the steady-state operating points. Additionally or alternatively, the error estimated value 33 preferably permits weighting of the input values which being input in the first step S01, wherein, depending on the expected informative power or accuracy of the input values, it is possible that the soot burn-off rate 31 is temporarily not calculated directly from the instantaneously present input values but instead is extrapolated using the values calculated beforehand. This is possible in a particularly suitable way if in the first step S01 a Kalman filter is used in which the calculation of the soot burn-off rate 31 can be shifted to internal states in the case of present input values which are heavily errored or do not have much informative power. This preferably takes place in turn in a transient operating state of the internal combustion engine 1.

In the second step S02, in addition to the soot burn-off rate 31, the temperature 35, preferably obtained using the temperature sensors 17, 19, in the particle filter 5 and the nitrogen oxide concentration 37, preferably obtained using the nitrogen oxide sensor 23, in the exhaust gas are also input as further input variables. In the second step S02, the soot burn-off rate 31 is then evaluated as a function of the temperature 35 and the nitrogen oxide concentration 37, wherein a function is adapted to the soot burn-off rate 31 by varying at least one adaptation parameter. In order to adapt the function, the method of the least mean squares or some other suitable method is preferably used. A linear function, a second degree polynomial or a third degree polynomial is preferably adapted to the soot burn-off rate 31. It is accordingly possible for more than one adaptation parameter to be varied for adapting the function to the soot burn-off rate 31.

If a function having only one adaptation parameter is used, precisely one value for the adaptation parameter results from its adaptation to the soot burn-off rate 31 in the second step S02, and otherwise a set of values of various adaptation parameters results from the second step S02. These cases are considered here together, wherein it is schematically illustrated that the second step S02 produces as a result an adaptation parameter 39 which can therefore be in this respect an individual value or a group or a set of different values.

In the third step S03 of the method, the adaptation parameter 39 is evaluated and the aging of the oxidation catalyst 7 is determined using the adaptation parameter 39. For this purpose, the latter is preferably compared with at least one characteristic value, particularly preferably a multiplicity of threshold values or limiting values, or with a characteristic diagram. Correspondingly, the third step S03 produces as a result aging 41 of the oxidation catalyst 7. This can be used for further methods, in particular for detecting ash or correcting ash of the particle filter 5.

In the third step S03, a development of the soot burn-off rate 43 over time is preferably also evaluated, wherein, in particular, the development of the adaptation parameter 39 over time is calculated. In a fourth step S04, it is preferably possible to carry out error detection on the basis of the development of the soot burn-off rate 43 over time and, in particular, to differentiate normal slow aging of the oxidation catalyst 7 from sudden changing, for example as a result of the destruction thereof or else also as a result of a sensor error. It is particularly preferably possible to differentiate various specific errors from one another using the specific profile of the development 43 over time. In this respect, the fourth step S04 preferably produces as a result a state 45 of the exhaust gas aftertreatment system 3 which supplies information as to whether said exhaust gas aftertreatment system is functioning without errors or whether an error, for example, destruction of the oxidation catalyst 7 or a sensor error is present. The state 45 can then be used, for example, to output a warning message to an operator of the internal combustion engine 1 and/or to initiate measures for overcoming the error. It is also possible for the internal combustion engine 1 to be deactivated on the basis of an evaluation of the state 45, in order to prevent the latter from being destroyed or damaged.

Figure 3:
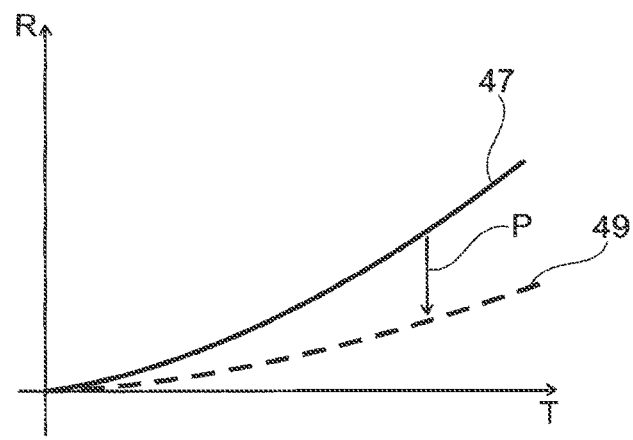
FIG. 3 shows a diagrammatic illustration of the parametric dependence of the soot burn-off rate on the aging of the oxidation catalyst.

FIG. 3 presents a schematic and diagrammatic illustration of the soot burn-off rate R in its parametric dependence on the age of the oxidation catalyst. For the sake of simpler illustration, the soot burn-off rate R is not plotted here either as a function of the nitrogen oxide concentration or of the exhaust gas temperature T but instead only as a function of the exhaust gas temperature T, which results in a figurative, two-dimensional representation. In this context, the soot burn-off rate R is plotted as continuous curve 47 with a constant nitrogen oxide concentration against the temperature T of the exhaust gas in the particle filter 5, wherein the profile of the continuous curve 47 corresponds to a new state of the oxidation catalyst 7. The effect of the aging of the oxidation catalyst 7 is illustrated here by an arrow P, wherein a dashed curve 49 corresponds to the corresponding profile of the soot burn-off rate R with a constant nitrogen oxide concentration as a function of the exhaust gas temperature T in the particle filter 5 for an aged oxidation catalyst 7. The aging of the oxidation catalyst 7 is perceptible by virtue of the fact that nitrogen monoxide is converted into nitrogen dioxide only to a reduced degree, with the result that the ratio of the nitrogen dioxide concentration to the overall nitrogen oxide concentration decreases as the aging of the oxidation catalyst progresses. Correspondingly, as illustrated by means of the arrow P, the soot burn-off rate also decreases, or it exhibits a flatter profile when plotted against the temperature with a constant nitrogen oxide concentration.

The soot burn-off rate is preferably adapted with a linear function, a second degree polynomial or a third degree polynomial, wherein, in particular, a third degree polynomial of the form $$R([NO_x],T;a,b,c) = a[NO_x](T-T_0) + b[NO_x](T-T_0)^2 + c[NO_x](T-T_0)^3 \quad (1)$$

is used. In this context, $[NO_x]$ is the nitrogen oxide concentration, T is the temperature of the exhaust gas in the particle filter 5, and $T_0$ is an offset parameter which takes into account the fact that virtually no burning off of soot takes place any more below a specific temperature. Here, the offset parameter $T_0$ is a temperature below which the soot burn-off rate R is virtually zero. The offset temperature $T_0$ is preferably from at least 200° C. to at maximum 300° C., particularly preferably 250° C. The parameters a, b and c are adaptation parameters which are varied within the scope of the method in order to adapt the function according to the equation (1) to the profile of the soot burn-off rate R.

If a second degree polynomial is used instead of the third degree polynomial according to equation (1), the third term, which has the parameter c, is simply preferably eliminated in comparison to the equation (1). In this respect, only the parameters a, b then have to be varied. If a linear function is used, it preferably has only the first term of equation (1) so that only the adaptation parameter a is varied.

If the function according to equation (1) is adapted to the soot burn-off rate, the adaptation results in values for the adaptation parameters a, b, c which are then used further as a value set or adaptation parameter 39 in the third step S03 according to FIG. 2, in order to determine the aging 41 of the oxidation catalyst 7 and/or to obtain the development 43 of the soot burn-off rate 31 over time.

From FIG. 3 it is in any case obvious that the temperature of the exhaust gas in the particle filter 5 is a variable for which a value of the adaptation parameters a, b, c depends on aging of the oxidation catalyst 7. The same applies to the nitrogen oxide concentration $[NO_x]$, and in particular to a combination of the temperature in the particle filter 5, on the one hand, and the nitrogen oxide concentration $[NO_x]$ on the other. The values of the adaptation parameters a, b, c are therefore characteristic of the state of aging of the oxidation catalyst 7, with the result that the latter can be readily obtained using the corresponding values. This is possible in any operating state of the internal combustion engine 1 in which the exhaust gas temperature in the particle filter 5 is in the range in which the burning off of soot takes place at least essentially, preferably completely, as a result of reaction of the soot particles with nitrogen dioxide as an oxidizing agent. A temperature range which satisfies this condition is preferably at least 150° C. to at maximum 500° C., particularly preferably from at least 250° C. to at maximum 450° C.

The determination of aging outlined here is virtually or completely impossible in a temperature range of the exhaust gas in the particle filter 5 in which the regeneration is essentially independent of the nitrogen dioxide concentration, in particular therefore at the rated power of the internal combustion engine and at high exhaust gas temperatures, in particular above 450° C. However, ash detection according to a conventional method can be carried out for this in corresponding operating states because the regeneration rate here does not depend on the aging of the oxidation catalyst. Therefore, during operation of the internal combustion engine 1 the method according to the invention for determining the aging of the oxidation catalyst is particularly preferably combined with a conventional method for detecting ash. In this way, complementary information about the state of the exhaust gas aftertreatment system 3 can be obtained, which information increases the accuracy of both the detection of ash and the determination of aging of the oxidation catalyst.

Figure 4:
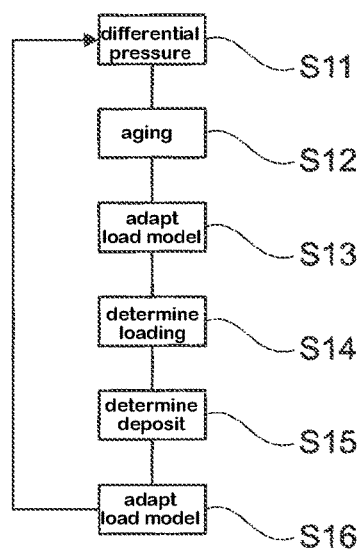
FIG. 4 shows a schematic illustration of an embodiment of the method for detecting ash.

FIG. 4 shows a schematic illustration of an embodiment of the method according to the invention for detecting ash in the manner of a flowchart. In this context, in a first step S11 a differential pressure which drops across the particle filter 5 is detected. In a second step S12, aging of the oxidation catalyst 7 is determined using one of the embodiments of the methods described above.

In a third step S13, a loading model is adapted to the aging of the oxidation catalyst 7.

In a fourth step S14, loading of the particle filter 5 is determined using the corrected loading model, wherein in a fifth step S15 a depositing of ash on the particle filter is determined from the load calculated using the corrected loading model, on the one hand, and the differential pressure, on the other.

Finally, in a sixth step S16, the loading model is preferably adapted to the detected depositing of ash on the particle filter 5.

The method is preferably carried out iteratively, with the result that after the end of the sixth step S16 it starts again in the first step S11.

It is possible for the method to be initialized, in particular, at a first pass when using a new particle filter 5, or one which has been cleaned of ash, with an initial value for the depositing of ash, with the result that in this respect the depositing of ash in the fifth step S15 is then not determined but instead the initial value is used. Alternatively or additionally it is possible for detection of ash to be carried out, preferably at regular intervals, according to a known method in an operating state in which the aging of the oxidation catalyst does not affect the burning off of soot, wherein in the fifth step S15 a value which is obtained within the scope of the conventional ash detection method is then preferably used for the depositing of ash instead of the value obtained there within the scope of the ash detection method proposed here. Under certain circumstances, this may increase overall the accuracy of the method.

It is particularly preferably possible that in operating states in which the aging of the oxidation catalyst is irrelevant for the burning off of soot, ash detection is carried out according to a conventional method, while in all the other operating states the method is carried out in the form proposed here according to the invention.

Overall it appears that by using the methods, the control device and the internal combustion engine which are proposed here it is possible to separate the effects of depositing of ash on the particle filter 5, on the one hand, and aging of the oxidation catalyst 7, on the other, on the rise in the differential pressure level across the particle filter 5, and as a result, in particular, to arrive, on the one hand, at a determination of the aging for the oxidation catalyst 7, and on the other hand, at an improved prediction of the soot load of the particle filter 5.

The invention claimed is:

1. A method for determining aging of an oxidation catalyst in an exhaust gas aftertreatment system of an internal combustion engine, comprising the steps of:
    obtaining a soot burn-off rate of a particle filter of the exhaust gas aftertreatment system;
    adapting a function, having at least one adaptation parameter, to the soot burn-off rate in dependence on at least one variable for which a value of the adaptation parameter is dependent on aging of the oxidation catalyst;
    determining the aging of the oxidation catalyst based on the value of the adaptation parameter which is obtained by adapting the function;
    replacing the oxidation catalyst when the aging reaches a predefined level;
    evaluating a development of the soot burn-off rate over time; and
    performing error detection using the development of the soot burn-off rate over time.

2. The method according to claim 1, including determining the aging of the oxidation catalyst by comparing the at least one adaptation parameter with at least one previously determined characteristic value.

3. The method according to claim 1, including adapting the function to the soot burn-off rate in dependence on a temperature of the particle filter and a nitrogen oxide concentration in the exhaust gas.

4. The method according to claim 1, including adapting a linear function, a second degree polynomial or a third degree polynomial to the soot burn-off rate.

5. The method according to claim 1, wherein the soot burn-off rate is obtained by the following steps:
    obtaining a differential pressure that drops across the particle filter;
    obtaining a load of the particle filter from the differential pressure using a loading model;
    obtaining a soot input into the particle filter, and
    obtaining the soot burn-off rate from the load and the soot input.

6. The method according to claim 5, including obtaining the soot burn-off rate using a Kalman filter.

7. The method according to claim 1, including evaluating the development of the at least one adaptation parameter over time.

8. A method for detecting ash in a particle filter of an exhaust gas aftertreatment system, comprising the steps of:
    detecting a differential pressure that drops across the particle filter;
    determining aging of an oxidation catalyst of the exhaust gas aftertreatment system by obtaining a soot burn-off rate of a particle filter of the exhaust gas aftertreatment system;
    adapting a function, having at least one adaptation parameter, to the soot burn-off rate in dependence on at least one variable for which a value of the adaptation parameter is dependent on aging of the oxidation catalyst;
    determining the aging of the oxidation catalyst based on the value of the adaptation parameter which is obtained by adapting the function;
    replacing the oxidation catalyst when the aging reaches a predefined level;
    adapting a loading model to the aging of the oxidation catalyst;
    determining a load of the particle filter using the adapted loading model; and
    determining depositing of ash on the particle filter from the load and the differential pressure.

9. The method according to claim 8, including adapting the loading model to the depositing of ash on the particle filter.

10. The method according to claim 8, including initializing the method with an initial value for a depositing of ash on the particle filter.

11. The method according to claim 8, wherein the method is carried out iteratively.

12. A control device for an internal combustion engine, the control device being configured to carry out a method comprising the steps of:
    obtaining a soot burn-off rate of a particle filter of the exhaust gas aftertreatment system;
    adapting a function, having at least one adaptation parameter, to the soot burn-off rate in dependence on at least one variable for which a value of the adaptation parameter is dependent on aging of the oxidation catalyst;
    determining the aging of the oxidation catalyst based on the value of the adaptation parameter which is obtained by adapting the function;
    replacing the oxidation catalyst when the aging reaches a predefined level;
    evaluating a development of the soot burn-off rate over time; and
    performing error detection using the development of the soot burn-off rate over time.

13. An internal combustion engine, comprising: an exhaust gas aftertreatment system having an oxidation catalyst; and a control device according to claim 12.

14. A control device for an internal combustion engine, the control device being configured to carry out a method comprising the steps of:

detecting a differential pressure that drops across the particle filter;

determining aging of an oxidation catalyst of the exhaust gas aftertreatment system by obtaining a soot burn-off rate of a particle filter of the exhaust gas aftertreatment system;

adapting a function, having at least one adaptation parameter, to the soot burn-off rate in dependence on at least one variable for which a value of the adaptation parameter is dependent on aging of the oxidation catalyst;

determining the aging of the oxidation catalyst based on the value of the adaptation parameter which is obtained by adapting the function;

replacing the oxidation catalyst when the aging reaches a predefined level;

adapting a loading model to the aging of the oxidation catalyst;

determining a load of the particle filter using the adapted loading model; and determining depositing of ash on the particle filter from the load and the differential pressure.

15. An internal combustion engine, comprising: an exhaust gas aftertreatment system having an oxidation catalyst; and a control device according to claim 14.

* * * * *